Nov. 17, 1936.                R. O. HENSZEY                2,060,865
                           IRRADIATING APPARATUS
                           Filed Feb. 10, 1934           6 Sheets-Sheet 1

Inventor
Roy O. Henszey
C. P. Gospel,
By
Attorney

Nov. 17, 1936.　　　R. O. HENSZEY　　　2,060,865
IRRADIATING APPARATUS
Filed Feb. 10, 1934　　　6 Sheets-Sheet 3

Inventor
Roy O. Henszey
By C. P. Goepel,
Attorney

Patented Nov. 17, 1936

2,060,865

UNITED STATES PATENT OFFICE 2,060,865

IRRADIATING APPARATUS

Roy O. Henszey, Oconomowoc, Wis., assignor to Carnation Company, Milwaukee, Wis., a corporation of Delaware Application February 10, 1934, Serial No. 710,716

5 Claims. (Cl. 99—248)

The present invention relates to a device or apparatus and a method for exposing substances to radiant energy from sources; such as, electric arcs, ultra-violet lamps and tubes, and from various other sources of radiant energy. It is known that the field of energy of a conductor of electricity creates an activating influence on certain inorganic as well as organic matter.

It is also known that radiant energy from different parts of the spectrum produce various effects on matter exposed to it. For example, the X-rays activate certain substances causing reactions which produce visible light, and the ultra-violet rays are useful in producing changes in certain food stuffs, especially in increasing the vitamine D content. Other parts of the spectrum may be used for sterilizing of products. The present invention relates more particularly to ultra-violet irradiation of liquids and substances in liquids, although it is understood that other energy and other substances may be used to carry out the features of the invention. Heretofore, the means of making exposures of this type have resulted in uneven distribution of energy on the substances being irradiated, or a large part of the radiant energy has been dissipated, or the space requirements of the equipment have been excessive. Other disadvantages have been large power consumption, inaccessibility and the like.

Heretofore it has been assumed that the ultra-violet irradiation from an electric arc, such as the carbon arc was uniform in all directions provided the electric input is maintained constant, and the carbons properly spaced. It has been definitely proven that the irradiation in different directions varies greatly in intensity and the radiation in any one direction is not constant.

It has also been found that by actual measurements the reflectors commonly used for ultra-violet irradiation are very inefficient.

In order to overcome all of these defects, the present invention makes use of a preferred arrangement wherein the source or sources of light do not constitute just one point of emanation but the sources are arranged to emanate from an area having both length and breadth and wherein such emanation is sufficiently distributed over this area to constitute practically a surface area of emanation of considerable extent.

In order to take full advantage of the radiant energy, the surfaces over which the substances to be irradiated are placed close to the source of radiant energy. This allows the maximum intensity of the radiant source to strike the substance. It is preferable according to the present invention to dispose substances to be irradiated on opposite sides of and close to the source of irradiation. By this means, the necessity of providing special reflecting means with its consequent absorption of valuable radiant output, is eliminated. If the substance being irradiated reflects energy it will be reflected to the substance being irradiated on the opposite surface and these surfaces are disposed close together so that the maximum intensity of the rays, both from the source and after being reflected by the substances being irradiated, are utilized.

Another advantage of the present invention is that when a liquid, such as milk, is flowing over the irradiated surface or surfaces, the reflection is very much greater than from any metallic reflector.

The rays are either absorbed or reflected. The absorbed rays produce their effect on the liquid. The reflected rays should therefore be utilized and not dissipated as in prior structures. It has been found by test that a very large portion of the rays are reflected and that it is therefore very important to utilize these rays and to this end the present invention provides supporting surfaces which are closely spaced apart and also closely spaced from the opposite sides of the area of emanation.

Heretofore, large cylinders have been tried out for the accomplishment of irradiation and wherein the diameter and length of the cylinder are approximately the same. Under these circumstances it is evident that the radiant energy which strikes perpendicular to the surface will reflect backward and forward until it is absorbed. However, if the rays strike at an angle to the surface of the cylinder or liquid spread over the surface, and if this angle is much more than 10° from the perpendicular, as 11.25°, it is evident that a part of the energy will be lost out of the top or bottom of the cylinder after the second reflection. If the angle of the rays is 22½°, it is evident that the energy will be lost out of the end of the cylinder after the first reflection. It is also found that the intensity of light is diminished with the degree of angularity from the perpendicular on account of the additional surface covered by any beam of rays.

In view of these considerations it will be noted that the reflecting surfaces become much more efficient when milk is flowing over them in view of the reflecting power of milk, as heretofore stated, and that two plane surfaces lying close together on opposite sides of the plane which is the source of the radiant energy, greater benefit and absorption is obtained by the direct and reflected energy than by use of apparatus of the cylindrical form. Since the surfaces in the present invention are close together and of relatively large extent, practically all of the rays are reflected forward and backward until they are absorbed.

While of a very undesirable and impractical nature for the handling of liquid or other material to be irradiated, a spherical surface with the source of rays at the center is ideal from the reflection standpoint to prevent loss of energy by reflection.

According to the present invention, therefore, small space is provided between the two irradiated surfaces and which are also relatively close to the opposite sides of the source of irradiation. Furthermore, the energy distribution is uniform because the total source consists of smaller sources of preferably equal size and uniformly distributed in a plane midway between the two surfaces to be irradiated.

In addition, the intensity of the radiant energy is great because the surfaces to be irradiated are close to the source of emanation and any reflected energy is transmitted through but a short distance to the opposite surface to be irradiated. Another advantage of the present invention is in the irradiation of liquids by use of surfaces disposed in vertical planes and wherein the source of irradiation is also in a vertical plane midway between the planes of said surfaces to be irradiated. With this arrangement the vapor film usually ascending protects the flowing liquid from the ozone which is formed near the ultra-violet source. In most cases sufficient heat is generated at the irradiating source to cause a rapidly ascending current of ozone which rises in a straight line and is preferably withdrawn by a mechanical suction apparatus from the top of the device.

A still further object of the present invention is to provide an irradiator device of compact simplified construction capable of handling relatively large amounts of milk or other substance in a short period of time, and wherein the structure is such that the milk is protected from over exposure to the ultra-violet rays, and wherein the milk is maintained in the zone of emanation for the required length of time, and wherein the invention provides a construction for the even distribution of the source of emanation over a relatively large surface area, and wherein the intensity of the source of emanation is maintained constant throughout substantially the whole area.

The invention also embodies certain detail features of construction for carrying out the objects of the present invention.

With the foregoing and other objects in view, the invention will be more fully described hereinafter, and will be more particularly pointed out in the claims appended hereto.

In the drawings, wherein like symbols refer to like or corresponding parts throughout the several views.

Figure 11ᵃ is a diagrammatic drawing of the action of the rays.

Referring now to the drawings, and first to the form of the invention shown in Figures 1 to 7, the device is provided with a top or distribution trough 25 which is of substantial length and of suitable width and depth to accommodate the capacity of milk or other substance to be treated. The trough is supported in any suitable manner, such as by a flange 26 between the upper ends of a pair of posts or standards 27 having feet 28 at their lower ends to engage a suitable support. The standards 27 are spaced apart to extend upwardly adjacent the opposite ends of the trough 25 and are adapted to support the various parts of the apparatus below the plane of the trough. The standards 27 are provided at vertically spaced apart points near the upper and lower ends of the apparatus, with cross braces or bars 29 which carry transversely extending arms 30 which are relatively short and disposed in series or pairs on the upper and lower bars 29. These arms 30 carry vertically disposed guards 31 which may be in the form of rods or bars as shown and which are secured in the outer end portions of the arms 30. The space between the bars provides a protected zone of emanation in which may be placed any suitable source of energy for projecting ultra-violet or other suitable rays from opposite sides of the device.

Figure 2:
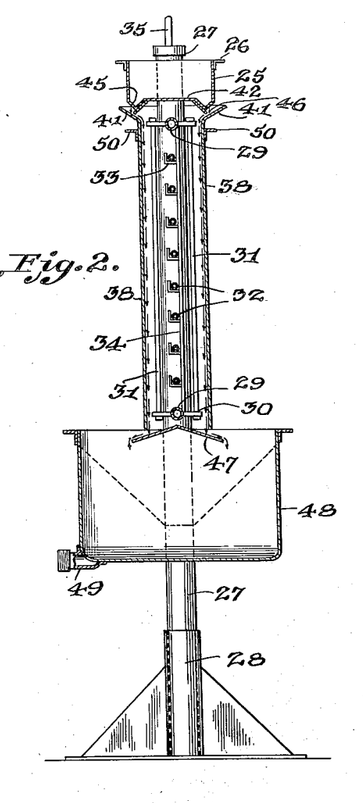
Figure 2 is a transverse section taken vertically through the same substantially on the line 2—2 of Figure 1.

In the present instance, one or more mercury vapor tubes 32 are provided and these are preferably arranged with their major portions horizontal between the guards 31 and in preferably a vertical plane, the horizontal sections of the tubes being supported upon brackets 33 which may be of hook form carried by supporting strips 34, any desired number of the strips 34 and hooks 33 being provided to accomplish the purpose. Preferably the arms 30 are utilized for supporting the strips 34, as shown in Figures 2 and 3.

The mercury vapor tubes 32 may be connected in a circuit in any desired manner and as shown in the present instance the post 27 may serve as housings for electric cables 35 and 36 which are connected to the respective ends of the tubes 32 by branch wires 37 or the like.

Figure 3:
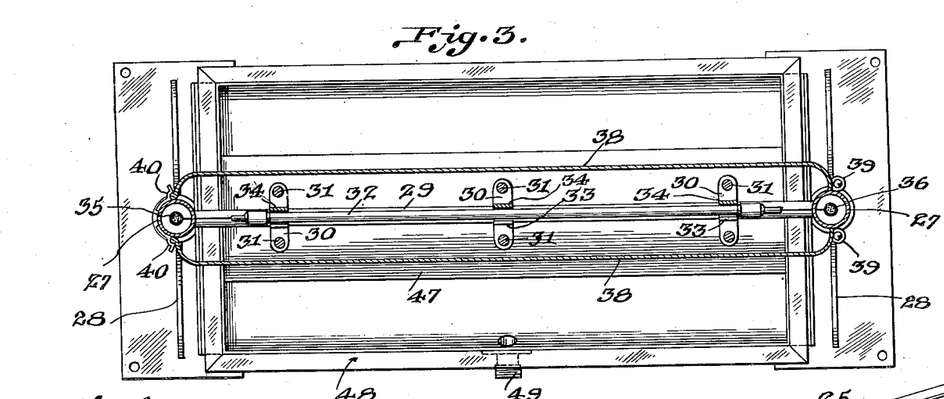
Figure 3 is an enlarged horizontal section taken through the device substantially on the line 3—3 of Figure 1.
Figures 4, 5, 6, 7:
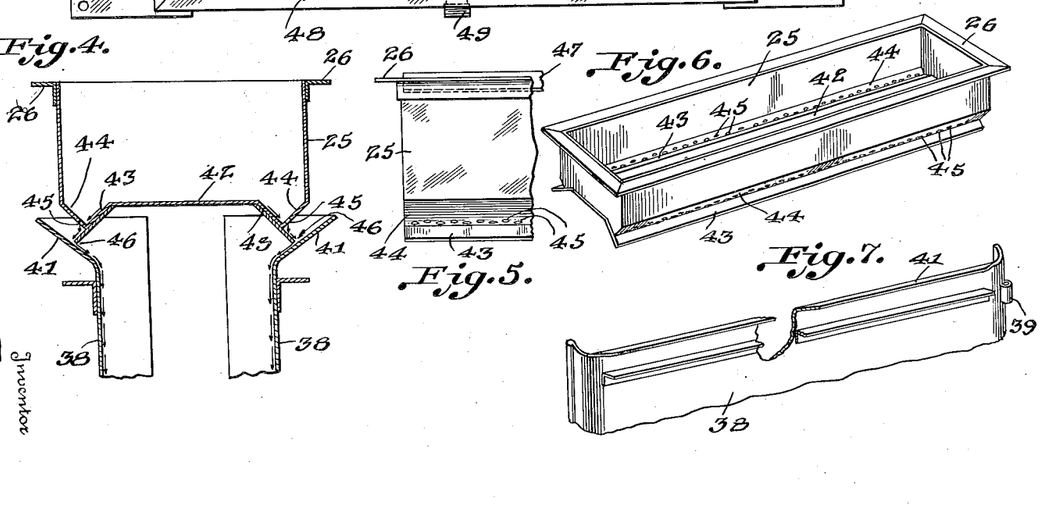
Figure 4 is a fragmentary enlarged sectional view taken transversely through the upper end of the device, showing the supply trough and the distributing means associated therewith for spreading the liquid into opposite sheets to flow down the opposite sides of the device.
Figure 5 is a fragmentary side elevation of a portion of the supply trough and distributing device of Figure 4.
Figure 6 is a detail perspective view of the supply trough.
Figure 7 is a fragmentary detail perspective view of the upper end of one of the side doors or plates of the device.

The device is closed in at opposite sides by side walls 38 which may be in the form of doors suitably hinged as at 39 at one end to one of the posts 27 and yieldingly held in closed position against the other post 27 by spring latches 40, as best shown in Figure 3. Each wall or door 38 is provided with a smooth reflecting surface at its inner side and over which the milk or other liquid is adapted to flow in film or sheet form. The upper ends of the walls 38 are flared outwardly away from each other at a desired angle to form spreading or receiving lips 41 and these lips 41 lie close to the bottom of the trough 25 and extend beyond the opposite sides of the trough, as clearly shown in Figures 2 and 4.

The trough 25 has a raised bottom 42 therein and the bottom is provided with outwardly inclined ledges 43 along its opposite longitudinal edges, and these ledges 43 meet at substantially right angles to inturned flanges 44 which provide continuations of the sides of the trough 25 and which abut the ledges at points spaced upwardly and inwardly from the lower edges of the ledges. The flanges 44 of the trough are provided with a plurality of openings 45 therethrough which are distributed throughout the length of the flanges 44 so as to admit of the passage of milk contained in the trough 25 over the ledges 43 throughout the lengths of the latter and to thus distribute the milk throughout substantially the length of the trough on the outside of the same. The ledges 43 are apertured or spaced, as at 46 from the outturned lips or flanges 41 of the sides 38, so that the sheets of milk which flow down over the ledges 43 are delivered in even and unbroken films or sheets to the adjacent walls 38 and are permitted to flow downwardly over the inner surfaces of the walls.

As shown in Figure 3, the opposite ends of the enclosure are sealed or closed not only by the posts 27, but also by the inturned or flanged opposite ends of the doors or walls 38, the door flanges being of sufficient depth only to properly accommodate the ultra-violet ray emanating devices and adjacent parts so that the inner surfaces of the walls 38 may be disposed in relatively closely spaced apart relation not only to each other but to the plane of emanation.

The bottom of the device is provided with a deflector 47 which is of the duplex type and may comprise a strip or sheet of metal extending between the posts 27 and bent along an intermediate line to provide outwardly and downwardly inclined surface portions at the opposite sides of the device. The deflector 47 therefore has a portion disposed not only beneath the lower edge of each side or door 38, but which also extends beyond the same and the deflector 47 is arranged closely adjacent the lower ends of the sides 38 to receive the sheets of fluid after treatment and to ease the fluid down into a receiving or catching trough 48 which is supported between the posts 27 beneath and about the deflector 47. The main object of the deflector 47 is to prevent irradiation of the milk which has passed into the trough 48. A drain pipe 49 is connected at one side, or other suitable point, to the lower trough 48 to carry off the treated milk. The doors 38 may be provided with suitable reinforcements 50 in the form of flanges or lips extending along the upper portions thereof beneath the flaring flanges 41.

In use, milk to be treated is placed in the trough 25 and is spread over the ledges 43 and flanges 44 onto the inner surfaces of the sides 38 and the milk flows downwardly over these surfaces in broad, thin films or sheets spread over a relatively wire and long surface area which, in the present instance, lies in a single plane. As the mercury vapor tubes 32 are arranged in a vertical row between the posts 27, they also extend over a relatively high and wide area in a single plane and the plane is intermediate the planes of the milk or other substance to be treated.

As a result, the irradiation takes place in a relatively narrow confined chamber which is of extensive area as regards the surface of emanation and reflection and absorption and consequently there is little or no loss of energy and a relatively large quantity of the substance is treated at one time as the substance flows continuously downwardly against the inner opposite sides of the device. The operation is thus continuous. The substance is subjected to the rays throughout a period determined by the rate of downward flow of the substance against the sides as the sides 38 are proportioned in height to prevent over treatment of the substance. Also, any desired number of the lamps can be turned on; and also the increase or decrease of the energy output of each lamp may be measured and controlled.

Another form of the invention is shown in Figures 8 to 11. In this form a horizontal support 51 is mounted on legs 52 and is provided across one end with a receiving or outlet trough 53 from which leads a drain pipe 54 for carrying off treated milk. A pair of brackets 55 is mounted on the support 51 near the trough 53 and each has a pivot 56 carrying a frame 57 supported in angular relation to the support 51 by pivoted brace arms 58 which are adjustably connected to the support 51 by a pin 59 and a series of slots or openings 60 in the arms 58. A pair of the arms 58 is provided to rigidly support the frame 57 in adjusted position. The frame 57 carries a plate 61 adapted to receive milk thereover to flow downwardly into the trough 53 in the form of a thin sheet or film from a supply trough 62 extending across the upper portion of the frame 57. The trough 62 is provided with suitable perforations 62' in its lower end adapted to uniformly distribute the milk or other substance over the wall or sheet 61.

Disposed along the opposite sides of the frame 57 and at spaced intervals thereover is a plurality of supports 63 for the reception of mercury vapor tubes 64 or the like which extend across the sheet 61 in closely spaced relation thereto, the tubes 64 being arranged in a single plane and disposed in parallel relation to the plane of the sheet 61. This structure provides a surface area of emanation and a surface area of substance film which are of considerable extent both lengthwise and transversely so that a large amount of the substance is treated at one time and the intensity of the emanations is uniform throughout the surfaces or planes. A suction hood 65 is mounted over the frame 57 and is connected to a suction pipe 66 for withdrawing ozone from about the tubes and also to protect the substance while being treated. This hood 65 carries a reflector 67 which is spaced over the upper or outer sides of the tubes 64 and which is adapted to entrap reflected rays and direct the same backwardly against the substance on the plate 61. It is well known that the opposite ends of the tubes 64 are not sources of emanation and it will be noted from Figure 10 that the reflector is flanged as at 68 along opposite sides and suitably slotted so as to enclose the space defined between the opposite end portions of the tubes so that the intensity of emanation will be substantially uniform throughout the entire enclosure.

The reflector 67 has a sufficient number of holes 67ª suitably distributed so that gases can pass therethrough and into the hood 65. It will be noted that the reflector 67 is relatively close to the flow of milk and reflects the rays of radiant energy, it being parallel with the sheet of milk. In case only one sheet of milk is provided in this embodiment, the source of radiant energy is uniformly distributed across the breadth of the milk surface, and the reflector is brought parallel with and close to the milk surface.

A further modification of the invention is shown in Figures 12 to 17. This structure is somewhat similar to the form shown in Figure 1, but wherein the side walls preferably each comprise a pair of doors 69 and the source of emanation is built up of two vertical series of mercury vapor tubes 70 which are connected in parallel relation in a suitable circuit including a wire or cable 71 and which may be provided with an automatic control device 72 for maintaining a uniform intensity in all of the tubes 70 of the two series. In this instance the apparatus may be relatively long and a relatively large quantity of the fluid substance treated at one time.

Figure 12:
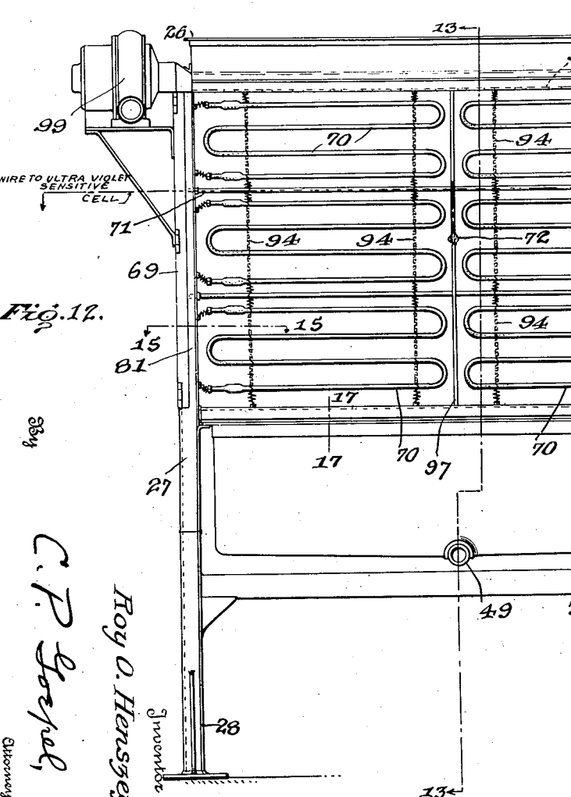
Figure 12 is a side elevation of another modified form of the device showing the adjacent side open to expose the source of emanation.
Figure 13:
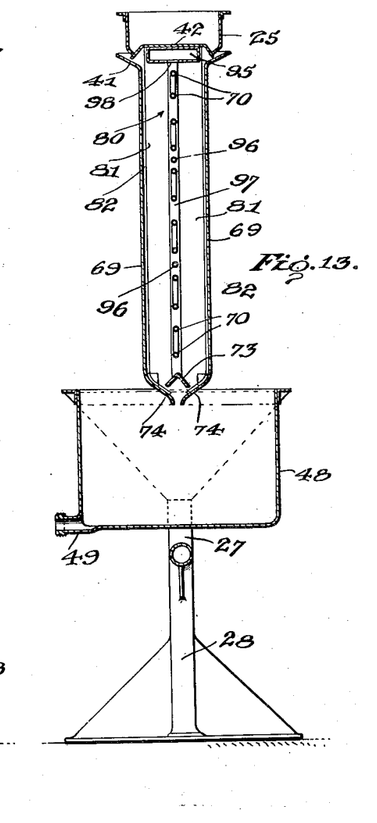
Figure 13 is a vertical section taken through the same substantially on the line 13—13 of Figure 12.
Figure 14:
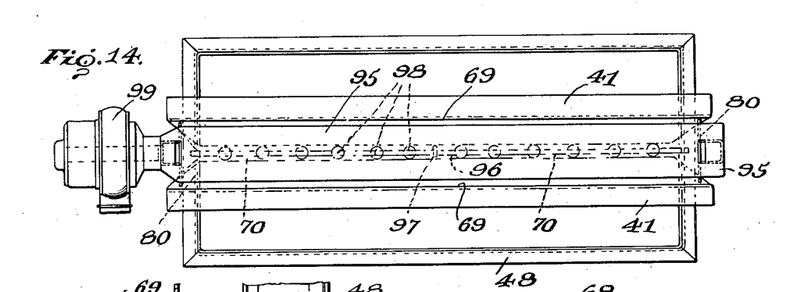
Figure 14 is a top plan view of the modification shown in Figure 12.
Figure 15:
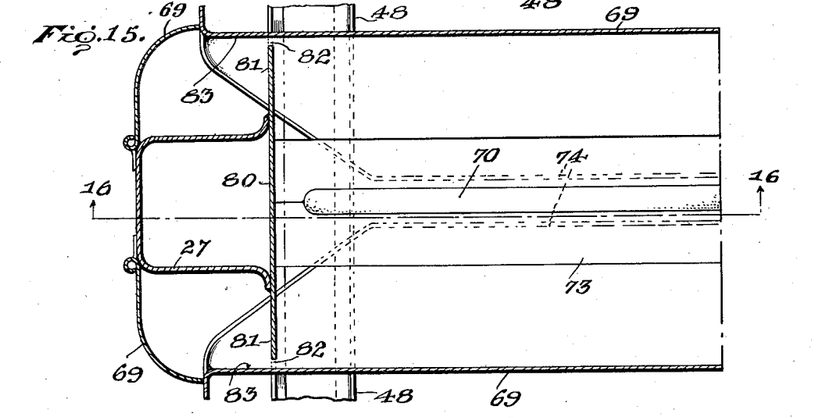
Figure 15 is a fragmentary enlarged horizontal section taken through one end of the device taken on the line 15—15 of Figure 12.
Figures 16, 17:
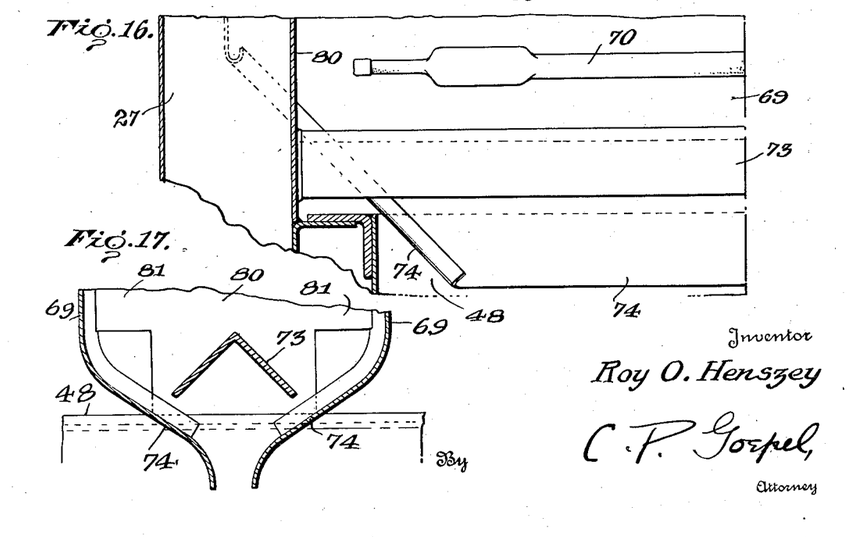
Figure 16 is a similar view taken on the line 16—16 of Figure 15.
Figure 17 is a fragmentary enlarged cross sectional view taken through the lower end of the device on the line 17—17 of Figure 12.

The tubes 70 are supported in a vertical plane in any suitable manner, such as by springs 94, shown in Figure 12, which extend vertically between an upper suction conduit 95 and a lower brace bar or deflector 73. Intermediate brace rods 96 extend between the ends or posts 27 of the frame at suitable points between the lamp tubes 70 and may be hollow as shown to serve as conduits for wiring 71 if desired. The automatic control device 72 may be an ultra-violet cell as shown and wired to the lamp conduits in any desired manner. A vertical brace rod 97 may also be used between the suction conduit 95 and the deflector 73 and an intermediate point between the two series of lamps 70 as shown. The suction conduit 95 is of suitable shape such as flat as shown and extends along the underside of the raised bottom 42 of the trough 25 and has suitable openings 98 in its bottom over the tubes 70. A suction fan unit 99 is mounted on the end of the frame and connected to the suction conduit 95 to withdraw ozone, vapors, air and the like from the region of the tubes 70. The deflector 73 also serves as a reflector in the present instance and may be mounted at the lower end of the tube structure and is spaced slightly away from the converging flanges 74 of the side walls or doors 69 to allow a circulation of air to permit ozone to be drawn from the top and at the same time to prevent the milk in the trough 48 from being irradiated. The milk is delivered into the lower trough or tank 48, after passing through the converging ends 74 of the walls 69. The operation is otherwise similar to the construction shown in Figure 1.

Figure 1:
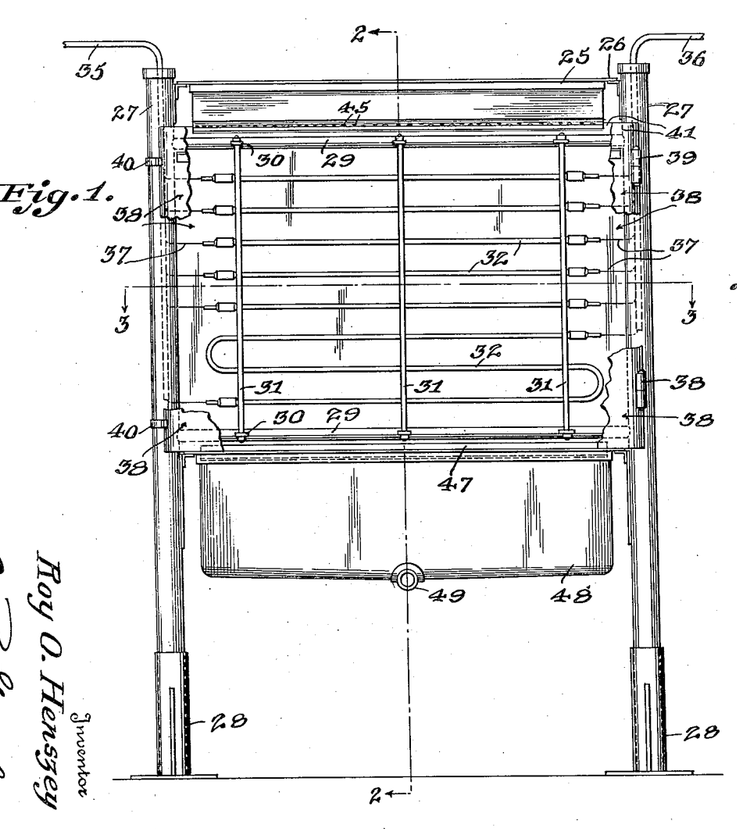
Figure 1 is a side elevation, partly broken away, of an irradiator device constructed according to the present invention for treating a fluid flowing downwardly in spaced sheets in the opposite sides of the device.

The embodiment shown in Figure 12 has almost twice the irradiating capacity as the embodiment shown in Figure 1. In Figure 1, the edge of the falling sheet of milk is sometimes formed into a skin-like substance, which has a tendency to become over-irradiated and has an ozone-like taste. This is overcome by the structure shown in Figure 15, wherein a shield 80 has extensions 81 close to the walls 69, but allowing a space 82 therebetween for the passage of the milk. These extensions prevent the milk which extends outwardly thereof along the wall 83, from being over irradiated.

Figure 8:
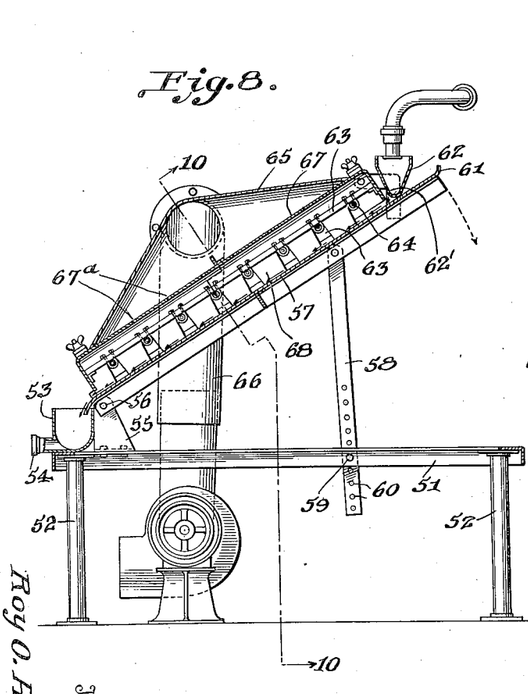
Figure 8 is a vertical longitudinal section taken through a modified form of the irradiator device substantially on the line 8—8 of Figure 9.
Figure 9:
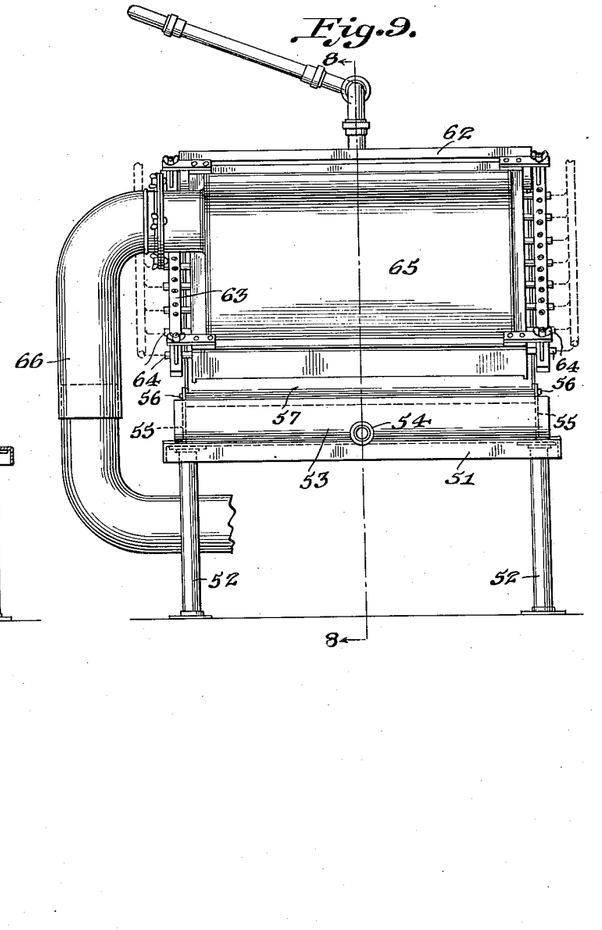
Figure 9 is an end elevation of the same.
Figure 10:
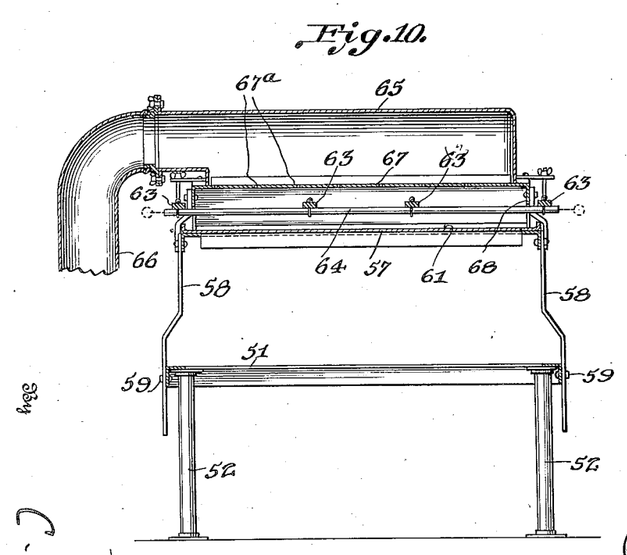
Figure 10 is a transverse section taken through the device substantially on the line 10—10 of Figure 8.
Figure 11:
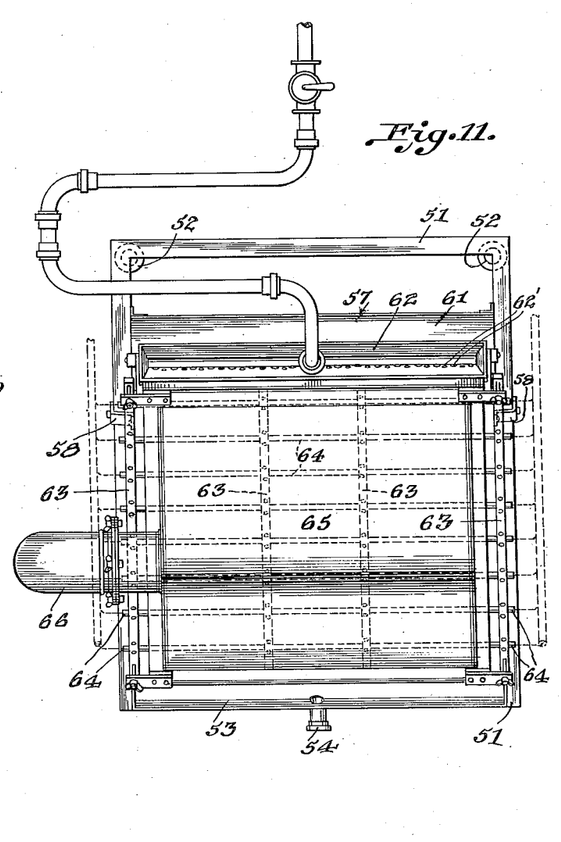
Figure 11 is a top plan view of the modified form of the device.
Figure 11A:
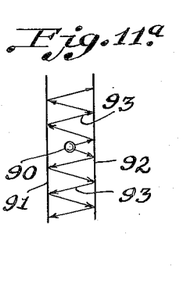

There has been shown a plurality of lamps, but a sheet of milk may be passed by one of these lamps, the others being out of circuit, and in this event the importance of the proximity of the milk to the lamp and to the deflector is apparent, be it a mechanical deflector like in Figure 8, or a sheet of milk as in Figures 1 and 12. It is here important that the deflector is sufficiently extended to be acted upon by all reflected rays, and this is best done by having the reflecting surface sufficiently large in length and breadth to carry out such reflections, and to have the reflecting surface substantially parallel with the substance being irradiated. This is shown diagrammatically in Figure 11ª in which 90 is the bulb, 91 the sheet of milk, 92 the reflector like 67 or another sheet of milk, and 93 the rays.

I have had very efficient results with the use of cold quartz low pressure mercury vapor lamps. Most of the output of these lamps falls within the ultra-violet spectrum; the efficiency of these lamps is very high as there is a comparatively large ultra-violet output compared to the electrical input.

It is obvious that various changes and modifications may be made in the details of construction and design of the above specifically described embodiment of this invention without departing from the spirit thereof, such changes and modifications being restricted only by the scope of the following claims.

What is claimed is:—

1. A liquid irradiating device comprising in combination spaced vertical supporting means, congruent doors extending between said supporting means mounted on one of said means and detachably secured to another of said means, said doors defining an enclosed irradiating space and being provided with inner reflecting planar surfaces adapted to receive a film of liquid to be irradiated, a substantially planar source of irradiation substantially midway between said doors having an irradiating area substantially co-extensive with the area of said doors and positioned to direct a uniform irradiation over the greater part of the inner surfaces of said doors, outwardly extending flanges mounted on the tops of said doors providing a surface for receiving said liquid and for evenly distributing the same prior to its passage into said irradiating space, means for collecting the irradiated liquid at the bottom of said doors and means for withdrawing gases and vapors resulting from the irradiation of said liquid at the top of said doors.

2. The structure of claim 1 wherein reflecting means are provided at the top and bottom of said doors for preventing escape of rays from said enclosed irradiating space.

3. A liquid irradiating device comprising in combination spaced vertical supporting means, congruent doors extending between said supporting means mounted on one of said means and detachably secured to another of said means, said doors defining an enclosed irradiating space and being provided with inner reflecting planar flow surfaces adapted to receive a film of liquid to be irradiated, a substantially planar source of irradiation substantially midway between said doors having an irradiating area substantially coextensive with said doors, means for screening the resulting irradiation from the side edges of said flow surfaces thereby preventing over-irradiation of the liquid at these edges, means for distributing liquid to be irradiated at the top of said doors and means for collecting the irradiated liquid at the bottom of said doors.

4. The structure of claim 3 wherein reflecting means are provided at the bottom of said doors for preventing escape of rays and over-irradiating of liquid which has passed out of said enclosed irradiating space.

5. The structure of claim 3 wherein said means for distributing liquid to be irradiated and for collecting the irradiated liquid respectively, enclose the top and bottom of said enclosed irradiating space and are provided with reflecting surfaces preventing escape of rays from said space.

ROY O. HENSZEY.